United States Patent [19]
Mihalczo

[11] Patent Number: 5,264,702
[45] Date of Patent: Nov. 23, 1993

[54] ON-LINE TRITIUM PRODUCTION MONITOR
[75] Inventor: John T. Mihalczo, Oak Ridge, Tenn.
[73] Assignee: Martin Marietta Energy Systems, Inc., Oak Ridge, Tenn.
[21] Appl. No.: 924,125
[22] Filed: Aug. 3, 1992
[51] Int. Cl.[5] .............................. G01T 3/06
[52] U.S. Cl. ..................... 250/390.11; 250/390.01
[58] Field of Search ............ 250/390.11, 391, 390.01, 250/370.11, 361 R

[56] References Cited
U.S. PATENT DOCUMENTS
4,454,424 6/1984 Strauss et al. ................. 250/390.11

OTHER PUBLICATIONS
"Glass Scintillators", Information Bulletin SC 105, Bicron Corporation, Newbury, Ohio 44065.

Primary Examiner—Paul M. Dzierzynski
Assistant Examiner—Richard Hanig
Attorney, Agent, or Firm—Earl L. Larcher; James M. Spicer; Harold W. Adams

[57] ABSTRACT

A scintillation optical fiber system for the on-line monitoring of nuclear reactions in an event-by-event manner is described. In the measurement of tritium production one or more optical fibers are coated with enriched $^6$Li and connected to standard scintillation counter circuitry. A neutron generated $^6$Li(n)T reaction occurs in the coated surface of $^6$Li-coated fiber to produce energetic alpha and triton particles one of which enters the optical fiber and scintillates light through the fiber to the counting circuit. The coated optical fibers can be provided with position sensitivity by placing a mirror at the free end of the fibers or by using pulse counting circuits at both ends of the fibers.

16 Claims, 2 Drawing Sheets

ON-LINE TRITIUM PRODUCTION MONITOR

This invention was made with the support of the United States Government under contract No. DE-AC05-84OR21400 awarded by the U. S. Department of Energy. The United States Government has certain rights in this invention.

BACKGROUND OF THE INVENTION

The present relates generally to an optical fiber scintillation system for use in radiation detecting applications, and more particularly to such an optical fiber scintillation system for on-line, event by event measurement of tritium production.

Tritium, a beta emitting isotope hydrogen, can be produced in several different ways including the neutron irradiation of $^6Li$ through a $^6Li(n)^3H$ reaction in a zero power or a power producing nuclear reactor. The accurate measurement of tritium production is highly desirable. A presently known and commonly used tritium production measuring technique measures the residual helium or tritium in irradiated $^6Li$ samples as a measure of tritium production, In order to accurately measure such tritium production to an accuracy of 1% by employing such a measuring technique, it was found that at least $10^{12}$ tritium atom-producing n reactions must occur to produce sufficient helium. Because of this requirement, some problems especially those associated with radiation exposure to workers in low power reactor mock-up experiments are present. For example, in a zero power mock-up of a future production reactor expected to replace production reactors of the United States Department of Energy at the Savannah River, S.C. site, the operation of the mock-up at a power of 1 KW in an unshielded facility is needed to provide the number of n reactions necessary for accurate measurements of tritium production by employing the aforementioned measuring technique. The operation of the unshielded reactor mock-up at such high power levels would expose workers to relatively high levels of radiation. In addition to such radiation problems in this reactor mock up, it has been found that in any facility including zero power and power producing nuclear reactors where the irradiation of $^6Li$ with neutrons is used for tritium production, the provision of a system or technique for measuring or monitoring of tritium production has not been adequately addressed let alone providing such a system or technique capable of on-line, event-by-event measurements of the tritium production.

Accordingly, it is a principal aim or objective of the present invention to provide a optical fiber scintillation system capable of providing on-line, event-by-event measurements of tritium production with such measurements being achievable and accurate to 1% even at reactor power levels that are lower by a factor by at least $10^6$ than the 1 KW power levels as would be required using the aforementioned previous technique for measuring tritium production as in the aforementioned zero power mock-up of the production reactor.

Another object of the present invention is to provide such a measuring system having position sensitivity for determining the position in the nuclear reactor or other tritium producer where in the n reactions are occurring and thus providing a positive position sensitive measurement of neutron activity.

Other and further objects of the present invention will become obvious upon an understanding of the illustrative embodiments about to be described or will be indicated in the appended claims, and various advantages not referred to herein will occur to one skilled in the art upon employment of the invention in practice.

In accordance with the present invention, highly accurate on-line tritium production measurements in an event-by-event manner are achieved by coating a scintillation optical fiber of a suitable length with enriched $^6Li$, preferably in the form of $^6LiF$, or another compound with an index of refraction lower than that of the optical fiber. The $^6Li$ coated optical fiber is positioned into a neutron producing environment such as found in the core of a nuclear reactor or in another tritium producing facility using neutron irradiation of $^6Li$ as a tritium producer. Neutrons contacting the $^6Li$ coating on the fiber effect $^6Li(n)T$ reactions at the coating with the resulting $\alpha$ particle or triton (tritium atom) from each reaction depositing some energy in the coating and producing a scintillation light pulse in the underlying fiber. Each light pulse propagates to the end of the fiber where it is amplified and counted by well known conventional scintillation counting techniques. In as much as each n reaction at the $^6Li$ coating produces a light pulse, and on-line, event-by-event measurement of tritium production is provided. With the $^6Li$-coated optical fiber projecting into the reactor, remote measurements of the tritium production, including such measurements as a function of position, can be achieved without encountering radiation exposure problems to workers as heretofore involved.

Lithium glass scintillators employing enriched $^6Li$, therein are presently available and have been previously utilized in radiation detectors for various radiation monitoring applications including the detection of alpha, beta, and gamma radiation in extreme environments. These lithium glass scintillators are fabricated by blending selected concentrations of enriched $^6Li$ with silicate glass. The glass-$^6Li$ blend is then formed into various shapes of scintillators including disks, rectangles, fibers, or cylinders, or is used in powder form. Such lithium glass scintillators are commercially available from Bicron Corporation, Newbury, Ohio 44065. However, it was found that while such previously available lithium glass scintillators in fiber form could adequately detect neutrons by the $^6Li(n)T$ reaction, such glass scintillators could not be satisfactorily used for on-line, event-by-event measurements, especially with any position sensitivity, of tritium production in nuclear reactors or other neutron producing facilities. This shortcoming of these previously known lithium glass scintillators is due to the presence of the reactant material, i.e., the enriched $^6Li$, in the glass which causes considerable deterioration of the light transmitting characteristics of the glass fiber so as to limit the maximum length of the $^6Li$-containing glass fibers to a length of about 2 inches for light transmitting purposes. The use of such short lithium glass scintillation fibers in a reactor or other neutron producing facility for tritium production monitoring purposes would not be practical due to the very limited length of these fibers.

The present invention overcomes the aforementioned problems associated with the limited light propagating characteristics of $^6Li$-glass fibers by providing a glass or plastic optical fiber with a $^6Li$ coating on external surfaces of the fiber. With this external $^6Li$ coating on the fiber, the fiber can be of any suitable length up to several meters so as to assure a lithium producing zone of neutron activity in a nuclear reactor can be adequately traversed for effecting highly accurate on-line, event-by-event measurements of tritium production.

SUMMARY OF THE INVENTION

While the present invention as described herein, is primarily directed to $^6$Li-coated glass or plastic optical fibers for on-line, event-by-event monitoring of tritium production, such optical fibers can be appropriately coated with other reactive materials for monitoring various other nuclear reactions in an on-line, event-by-event manner including such monitoring with position sensitivity. For example, by coating the glass or plastic optical fibers with a $^{10}$B compound then $^{10}$B(n), reactions could be measured event-by-event as function of position. Also, the optical fibers could be coated with a $^{235}$U compound for the measurement of fission density distribution, with a $^{238}$U compound to give event by event fast fission production in a reactor, or with other elements which react with neutrons to provide energetic particles that escape the coating and produce light in the optical fiber.

Generally, the present invention in its basic form is scintillation optical fiber for use in a radiation detector and comprises an elongated scintillation optical fiber with a coating of a nuclear reactive material on exposed surface regions thereof. The optical fiber with the coating of nuclear reactive material thereon is characterized by the production of particles with active energy in the coating upon contact therewith by a nuclear particle or ray with the energetic particle being received by the optical fiber for producing a pulse of scintillation light therein for transmission through the fiber to a suitable pulse counting circuit. Reactive materials providing the coating include $^6$LiF, $^{10}$B, $^{235}$U, or $^{238}$U, and the coating is a thickness no greater, and preferably slightly less, than the shortest range of any energetic particle produced by the reaction of the coating with a nuclear particle or ray.

The position sensitivity of the event by event optical fiber measuring system of the present invention is provided by placing a mirror at the free end of the coated fiber opposite the pulse counting circuit or by placing such a pulse counting circuit at each end of the optical fiber. By using the mirror or dual pulse counting circuits, position sensitive measurements of the reactions over the length of the fiber can be readily achieved with such position sensitivity providing an accurate measurement of reactivity at various locations over the length of the optical fiber scintillator.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

As briefly described above, the present invention is directed to a coated scintillation optical fiber system useful for monitoring a variety of nuclear reactions that are capable of producing energetic reaction products at the coated surface of the optical fiber for affecting scintillation light pulses within the optical fiber. The present invention is particularly useful for the on-line monitoring of tritium production in an event-by-event manner. The present invention is also particularly useful for providing position sensitive measurements for determining reaction activities at various locations with a reactive zone.

Figure 1:
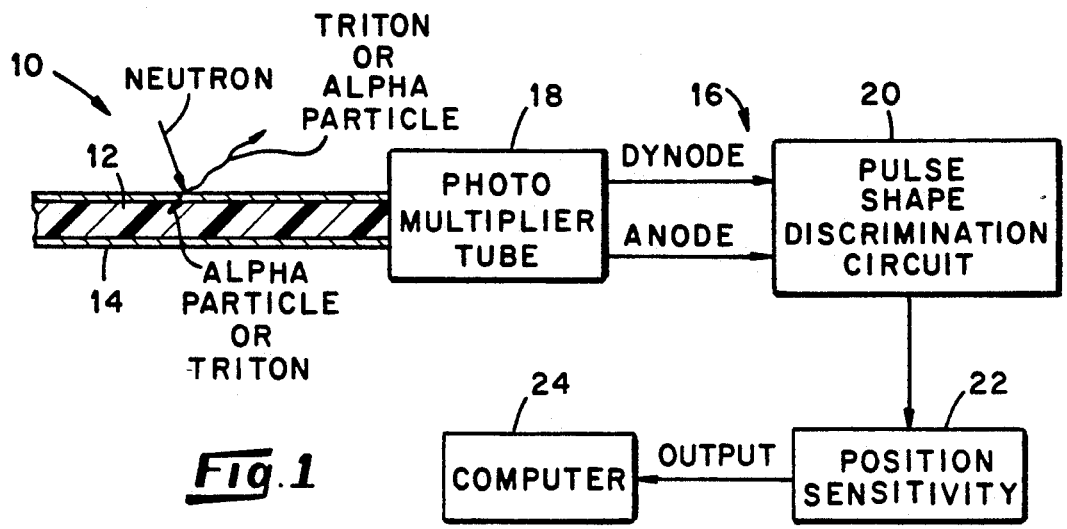
FIG. 1 is a schematic diagram illustrating a embodiment of the scintillation optical fiber system of the present invention using a single, coated optical fiber for on-line, event-by-event measurements of tritium production.

With reference to the embodiment of FIG. 1, the coated scintillation optical fiber system 10 of the present invention is shown provided by an optical fiber 12 formed of glass such as fused silica or a synthetic polymer such as polystyrene. The optical fiber 12 is of a diameter of about 1 mm or 0.04 inch which is adequate for supporting a nuclear reactive coating 14 thereon and for transmitting a light pulse resulting from a nuclear reaction occurring in the coating 14 to suitable light pulse amplifying and pulse counting circuit as generally shown at 16. The length of the optical fiber 12 may be of any suitable length in a range from several inches to several meters and which is sufficient to provide adequate on-line, event-by-event measurements of nuclear activity in the surface of coating 14. Of course, the length of the fiber 12 can be greater than that of the coating 14 since only the length of the fiber 12 subject to nuclear activity needs to be coated for providing features of the present invention. The optical fiber 12 is shown provided with a coating 14 of enriched $^6$Li, preferably $^6$LiF, over the exposed surface regions thereof with this coating being preferably of a uniform thickness. With the optical fiber 12 so coated with $^6$Li, preferably enriched to about 95%, a neutron contacting the coating 14 will induce a nuclear $^6$Li(n)T reaction in the coating with energetic $\alpha$ particles and tritons, "T", being ejected from the coating 14 in directions 180° apart from one another. The energy in the $\alpha$ particle or the triton leaving the coating 14 produces scintillation light in the fiber 12 which then propagates to both ends of the fiber 12. If the index of refraction with 6 Li fluoride coating is lower than that of the scintillation fiber 12 when formed of a particular material, the light will propagate in both directions along the length of the fiber. However, if the $^6$Li fluoride coating 14 has an index of refraction higher than that of the particular fiber 12, the latter is coated with a thin film of any suitable material having a higher index of refraction than that of the coating to assure that any light pulse generated in the fiber 12 by the nuclear reaction in the coating 14 will propagate along the fiber 12.

The $\alpha$ particle and the triton resulting from $^6$Li(n)T reaction respectively have a range of about 10$\mu$ and about 25$\mu$ in the fiber or the cladding material. Thus, the thickness of the coating 14 must be no greater than and preferably less than the range of the energetic particle with the shortest range, i.e., the $\alpha$ particle, to assure that a reaction product from the n reaction in the coating 14 will penetrate the coating 14 to produce a light pulse in the optical fiber 12 indicative of the reaction. The coating 14 of the $^6$LiF used for the monitoring of tritium production is of a thickness less than about 10$\mu$ and may be applied to the fiber 12 in any suitable manner such as by evaporation deposition or by extrusion coating with a suitable polymer. In the event the fiber has an index of refraction higher than that of the particular optical fibers used and appropriately coated with a material as described above, the total coating thickness must still be less than the range of the shortest energetic particle from the reaction to assure that the fiber functions in the intended manner. As shown in FIG. 1, one end of the coated fiber 12 is directly connected to a conventional photo amplifying tube 18 capable of receiving and amplifying the light pulses emerging from the fiber.

These amplified light pulses are shown coupled into a pulse shape discriminating circuit 20 of a conventional design and having the capability of discriminating against pulse of different shapes. The pulse discriminating circuit 20 is particularly useful in tritium production applications, such as provided in zero power producing reactors since fission reactions occurring in the reactor also produces gamma rays which penetrate the coating 14 and produce scintillation light pulses in the fiber 12. However, since the gamma rays produce scintillation light pulses in the fiber 12 are of a different pulse shape than provided by the $\alpha$ particle or the triton the pulse shape discrimination circuit 20 is used to discriminate against the pulses provided by gamma ray scintillations. Such discriminating assures that the light pulses being counted in the counting by the system of the present invention are the pulses resulting from the $^6$Li(n)T reactions. These pulses less those resulting from gamma ray scintillation are conveyed into a position sensitive circuit 22 as will be described in greater detail below and then into a computer 24 or any other suitable pulse counting mechanism that is of a conventional construction and capable of counting event-by-event reactions emanating from the scintillation optical fiber.

Figure 2:
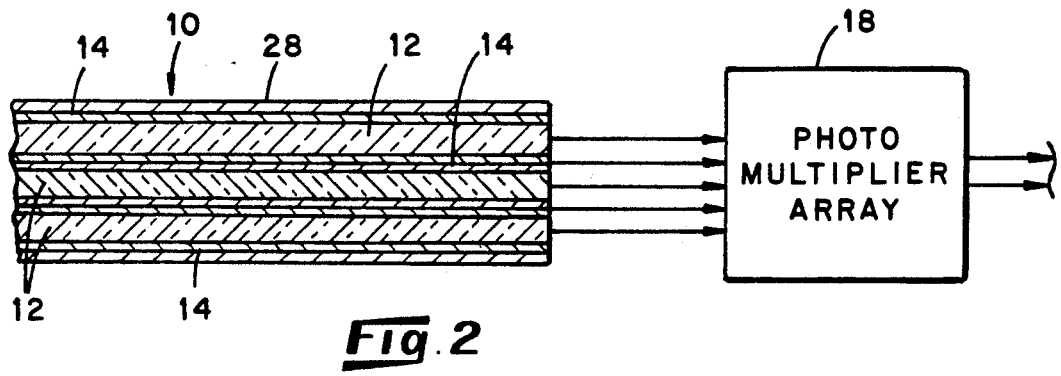
FIG. 2 is a schematic diagram showing a preferred embodiment of the present invention wherein a bundle of the scintillation optical fibers are used for tritium production measurements.
Figure 3:
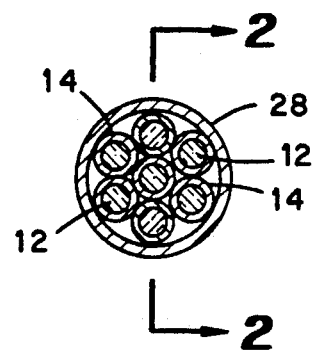
FIG. 3 is an elevational sectional view showing further details of the FIG. 2 embodiment.

With reference to FIGS. 2 and 3, a preferred embodiment is shown in which a plurality of the coated optical fibers 12 are bundled together to increase the surface area of the reactive coatings and thereby the sensitivity of the system 1 0. The use of a bundle of such fibers 12 is advantageous since the range of the $\alpha$ or the T particle is very short so as to require that thickness of the coating 14 and the fibers 12 each be less than about 10$\mu$. Each of the coated optical fibers is individually coupled to the photo multiplier tube 18.

While the bundle is shown formed with seven individually coated optical fibers of a round or cylindrical configuration, it is to be understood that any number of coated optical fibers 12 may be used to form a bundle thereof and that the optical fibers may be of a square cross-section so as to provide for tighter packing of the coated fibers in the bundle. By employing a bundle formed of a plurality of coated fibers, both the particle and the triton which are ejected in opposite directions could end up in the coatings on different fibers in the bundle so as to convert most of the reaction product energy into light and thereby providing for a highly accurate measurement of the tritium production in an event-by-event manner.

Figure 4:
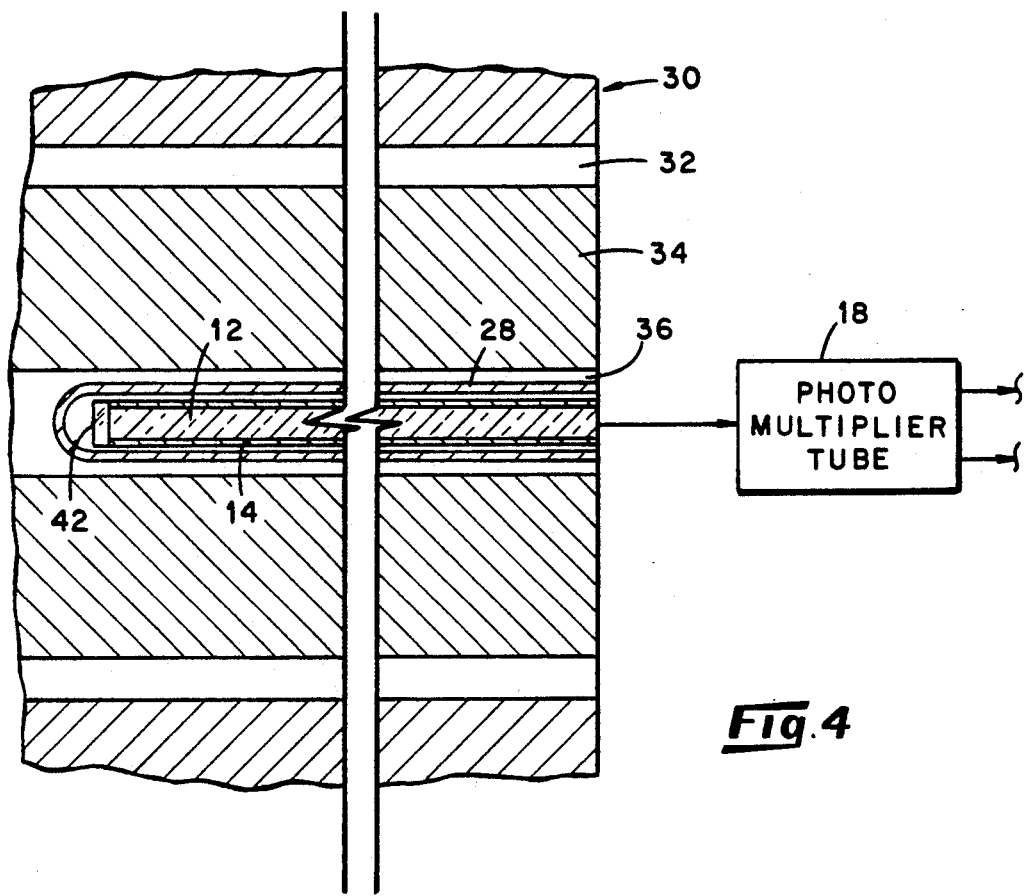
FIG. 4 is a schematic view illustrating $^6$Li-coated scintillation optical fiber of the present invention contained within a control rod positioned within an appropriate channel of a nuclear reactor and with the optical fiber being provided with a mirror at the free end thereof for providing position sensitive measurements of the tritium production activity.
Figure 5:
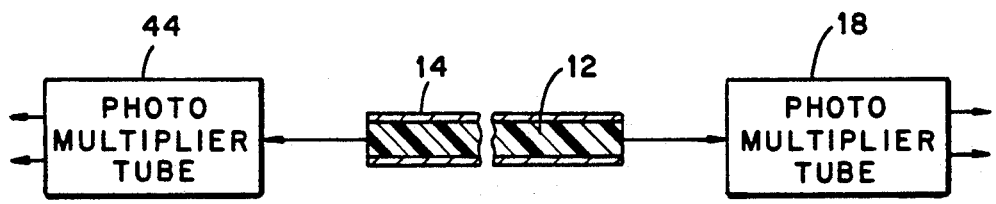
FIG. 5 is a schematic diagram illustrating a further embodiment of the present invention wherein the coated scintillation optical fiber is provided with light amplifying and light pulse counting circuitry at both ends thereof for position sensitive measurements of the nuclear reactions over the length of the fiber.

As further shown in FIGS. 2 and 3, the bundle of coated optical fibers are encased in a light-tight tube 28 for shielding the optical fibers from light sources other than those generated by nuclear reactions since spurious light sources would detract from the accuracy of the system. All the coated fiber embodiments, including the single coated fibers as shown in FIGS. 1, 4 and 5, and the bundles of coated fibers are preferably confined within a light-tight tube. However, since the coating itself can serve as the cladding the use of the light-tight tube is not to required to shield the fiber from spurious light sources but is desirable to structurally support the coated fiber or plurality of coated fibers.

The light-tight tube 28 may be a simple cylinder of aluminum or stainless steel of a thickness adequate to shield the fibers from external light sources and provide for structural support of the optical fiber assemblies so as to maintain them in a close-packed bundle form as well as in a desired configuration for use in various neutrons and nuclear reaction environments. A satisfactory thickness of the tube 28 is in the range of about 0.005 to 0.025 inch since neutrons will readily penetrate stainless steel or aluminum tubing of such thickness.

As shown in FIG. 4, the scintillation optical fiber assembly 1 0 is shown contained in a nuclear reactor generally indicated by the numeral 30 such as would be used for tritium production. As shown, the core of the reactor 30 is provided with a channel 32 capable of containing a control rod 34 having a central bore or passageway 36. The $^6$Li-coated optical fiber 12, preferably a bundle of such fibers, and provided with a light-tight tube support 28 is placed within the central bore 36 of the control rod 34 for detecting neutron activity in the reactor 30 and thus monitoring the production of tritium within the reactor 30. FIG. 4 also illustrates the use of a mirror 42 mounted at the free end of the fiber 12 for reflecting the scintillation light pulses received at the mirror 42 back through the fiber 12 into the photo multiplier 18 and the counting circuit. By employing a mirror 42 at the free end of the fiber or fiber bundle, position sensitivity of the reaction can be readily achieved in that the delay between a light pulses first received in the position sensing circuit, as in FIG. 1, and the same light pulse reflected from the mirror 42 back through the fiber to the position sensing circuit is readily measured to provide a signal indicative of the position of the reaction occurring on the optical fibers.

Another embodiment of the present invention for providing position sensitivity is shown in FIG. 5. In this embodiment a photo amplifier 44, including pulse counting circuitry as in FIG. 1, is coupled to the end of the coated fiber 12 instead of the mirror 42 in the FIG. 4 embodiment so that the time lapse between the reception of a light pulse at one counting circuit and at the other counting circuit is indicative of the position on the coated optical fiber where the light producing reaction occurred.

In the event it is desired to let photons rather than particle energy enter the core of a wave-length shifting optical fiber where the photon fluoresces to provide light in the fiber, then the coating of LiF, which now would contain a phosphor for photon production, could be considerably thicker (several α particle ranges) than that of LiF coatings utilized in the embodiments of the invention as described above where the thickness of the coatings is limited by the range of the α particle.

It will be seen that the present invention provides a coated optical fiber scintillator system which can be used for accurately verifying various nuclear reactions such as the tritium production and fission density in a nuclear reactor. Also, the coated optical fiber scintillation system can provide for the counting of low level neutrons reactions in a variety of neutron fields such as occurring around accelerators, nuclear fusion mechanisms, and power reactors. The nuclear reactions induced on the surface of the scintillation optical fibers of the present invention measure the reaction rates or incident particle fluxes with the particular reaction to be measured being readily selected by a choice of the coating material employed on the optical fiber.

What is claimed is:

1. A scintillation optical fiber for use in a radiation detector, comprising at least one elongated scintillation optical fiber and a coating of a nuclear reactive material on exposed surface regions of the optical fiber with said reactive material characterized by the production of at least one particle with active energy in the coating upon contact with an exposed surface region of the coating by a nuclear particle or ray with one of said at least one particle with active energy being received by the optical fiber for producing a pulse of scintillation light therein for transmission through the fiber.

2. A scintillation optical fiber as claimed in claim 1, wherein said reactive material providing said coating comprises $^6Li$, $^{10}B$, $^{235}U$, or $^{238}U$.

3. A scintillation optical fiber as claimed in claim 2, wherein said coating is of a thickness generally corresponding to the shortest range of travel of said at least one particle.

4. A scintillation optical fiber as claimed in claim 3, wherein the optical fiber is formed of glass or a synthetic polymer.

5. A scintillation optical fiber as claimed in claim 1, wherein the coating comprises $^6Li$ with the nuclear particle contacting the coating being a neutron for producing a $^6Li(n)T$ reaction with the coating, wherein said at least one particle is provided by an α particle and a triton, and wherein said thickness of the coating is up to a thickness corresponding to the range of the α particle.

6. A scintillation optical fiber as claimed in claim 5, wherein the coating consists essentially of $^6LiF$.

7. A scintillation optical fiber as claimed in claim 5, wherein a the optical fiber with said coating thereon is encased in a light impervious tube.

8. A scintillation optical fiber as claimed in claim 7, wherein said at least one optical fiber is provided by a plurality of optical fibers each with said coating thereon and disposed in said tube in a side-by-side relationship in the form of a bundle.

9. A scintillation optical fiber as claimed in claim 1, wherein the optical fiber with said coating thereon is adapted to be contacted by a plurality of nuclear particles or rays for providing a plurality of active energy particle producing reactions, wherein at least one end of the optical fiber is coupled to pulse amplifying means for amplifying the pulse of scintillation light transmitted through the fiber, and wherein pulse counting means are adapted to receive signals indicative of each of said light pulses for providing an event-by-event measurement of said reactions.

10. A scintillation optical fiber as claimed in claim 9, wherein the coating comprises $^6Li$ with the nuclear particles contacting of the coating including neutrons for producing a $^6Li(n)T$ reactions with the coating, wherein said at least one particle produced by each reaction is provided by an α particle and a triton, and wherein the α particle or the triton from each reaction provides a scintillation pulse of light in the coated fiber.

11. A scintillation optical fiber as claimed in claim 10, wherein the thickness of the coating is less than the range of the α particle.

12. A scintillation optical fiber as claimed in claim 10, wherein said at least one optical fiber is provided by a plurality of optical fibers each with said coating thereon, and wherein the plurality of coated optical fibers are disposed in a side-by-side relationship in the form of a bundle.

13. A scintillation optical fiber as claimed in claim 12, wherein the bundle of the coated optical fibers is encased in a light impervious tube.

14. A scintillation optical fiber as claimed in claim 10, wherein pulse discriminating means are coupled between the pulse amplifying means and the pulse counting means for discriminating against light pulses of shapes different from the pulse shapes provided by either the α particle or the triton.

15. A scintillation optical fiber as claimed in claim 9, wherein the pulse amplifying means are coupled to one end of the optical fiber, and wherein light reflecting means are disposed at the end of the optical fiber opposite to the pulse amplifying means for providing the latter with a reflection of each light pulse produced in the optical fiber, wherein circuit means are adapted to sequentially receive each light pulse and the reflection thereof for measuring the lapse in time between the reception of each light pulse and the reflection thereof from the mirror means to provide a signal indicative of position of each light-pulse producing reaction on the coated optical fiber.

16. A scintillation optical fiber as claimed in claim 9, wherein pulse amplifying means and pulse counting means are coupled to the coated optical fiber at each end thereof, whereby the difference in time each light pulse traveling in opposite directions in the optical fiber is received and counted in each of said pulse counting means provides measurement of the position of each reaction on the coated optical fiber.

* * * * *